United States Patent
Seely

(10) Patent No.: US 9,298,173 B2
(45) Date of Patent: Mar. 29, 2016

(54) SYSTEM AND METHOD TO PERFORMANCE TUNE A SYSTEM

(75) Inventor: William Forrester Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 13/364,426

(22) Filed: Feb. 2, 2012

(65) Prior Publication Data
US 2013/0204446 A1 Aug. 8, 2013

(51) Int. Cl.
*G05D 17/00* (2006.01)
*G05B 13/04* (2006.01)

(52) U.S. Cl.
CPC *G05B 13/04* (2013.01); *Y02E 20/16* (2013.01)

(58) Field of Classification Search
CPC .... G05B 13/04; G05B 13/041; G05B 13/042; Y02E 20/16; G06F 11/3409; G06F 11/3447
USPC ............... 700/28, 29, 30, 32, 33, 34, 37, 101, 700/108, 109, 110, 286, 287; 702/81, 82, 702/84, 182, 183
See application file for complete search history.

(56) References Cited

U.S. PATENT DOCUMENTS

| | | | | |
|---|---|---|---|---|
| 4,249,238 A * | 2/1981 | Spang et al. | | 701/100 |
| 4,534,216 A * | 8/1985 | Fasano et al. | | 73/147 |
| 5,005,351 A * | 4/1991 | Archer | | 60/686 |
| 5,914,875 A * | 6/1999 | Monta et al. | | 700/79 |
| 6,364,602 B1 * | 4/2002 | Andrew et al. | | 415/1 |
| 6,379,108 B1 * | 4/2002 | Schmidt | | 415/1 |
| 6,772,051 B2 * | 8/2004 | Nagafuchi et al. | | 700/287 |
| 6,785,633 B2 * | 8/2004 | Patanian et al. | | 702/182 |
| 6,799,078 B1 * | 9/2004 | Berkooz et al. | | 700/28 |
| 6,907,320 B2 * | 6/2005 | Nagafuchi et al. | | 700/292 |
| 6,980,891 B2 * | 12/2005 | Nagafuchi et al. | | 700/286 |
| 7,086,391 B2 * | 8/2006 | Moulin et al. | | 123/673 |
| 7,188,004 B2 * | 3/2007 | Nagafuchi et al. | | 700/295 |
| 7,251,582 B2 * | 7/2007 | Singh et al. | | 702/183 |
| 7,356,383 B2 * | 4/2008 | Pechtl et al. | | 700/288 |
| 7,496,429 B2 * | 2/2009 | Nagafuchi et al. | | 700/292 |
| 7,908,072 B2 * | 3/2011 | Tonno et al. | | 701/100 |
| 8,285,468 B2 * | 10/2012 | Tonno et al. | | 701/100 |
| 8,423,161 B2 * | 4/2013 | Wilkes et al. | | 700/31 |
| 8,437,941 B2 * | 5/2013 | Chandler | | 701/100 |
| 8,447,564 B2 * | 5/2013 | Gross et al. | | 702/182 |
| 8,601,813 B2 * | 12/2013 | Shutty et al. | | 60/605.2 |
| 8,959,006 B2 * | 2/2015 | Nasle | | 703/2 |

(Continued)

FOREIGN PATENT DOCUMENTS

| | | |
|---|---|---|
| EP | 0676587 A1 | 10/1995 |
| EP | 2249007 A2 | 11/2010 |

OTHER PUBLICATIONS

European Search Report and Opinion issued in connection with corresponding EP Application No. 13153382.0 on Feb. 2, 2015.

*Primary Examiner* — Charles Kasenge
(74) *Attorney, Agent, or Firm* — Ernest G. Cusick; Frank A. Landgraff

(57) ABSTRACT

A system to performance tune a site system includes one or more controllers each controlling a subsystem of the site system by changing values of a set of parameters. The system also includes a site reference model configured to indicate a target performance of the site system, and a processor configured to instruct the one or more controllers based on the target performance for the site system.

14 Claims, 3 Drawing Sheets

(56) References Cited

U.S. PATENT DOCUMENTS

| | | |
|---|---|---|
| 2001/0056315 A1* | 12/2001 | Nagafuchi et al. ............ 700/286 |
| 2003/0000199 A1* | 1/2003 | Nagafuchi et al. ............ 60/39.24 |
| 2004/0184203 A1* | 9/2004 | Nagafuchi et al. ............ 361/20 |
| 2004/0254684 A1* | 12/2004 | Nagafuchi et al. ............ 700/286 |
| 2006/0178782 A1* | 8/2006 | Pechtl et al. ................... 700/286 |
| 2006/0200325 A1* | 9/2006 | Hayashi ............................ 703/2 |
| 2007/0106427 A1* | 5/2007 | Nagafuchi et al. ............ 700/295 |
| 2008/0243352 A1* | 10/2008 | Healy ............................ 701/100 |
| 2009/0005951 A1* | 1/2009 | Frederick et al. ............. 701/100 |
| 2009/0005952 A1* | 1/2009 | Tonno et al. ................... 701/100 |
| 2009/0138324 A1* | 5/2009 | Nagafuchi et al. ................ 705/9 |
| 2009/0158734 A1* | 6/2009 | West et al. .................... 60/605.2 |
| 2010/0101226 A1* | 4/2010 | Shutty et al. .................... 60/602 |
| 2010/0236241 A1* | 9/2010 | Kumar et al. .................... 60/653 |
| 2010/0286890 A1* | 11/2010 | Chandler ...................... 701/100 |
| 2011/0137536 A1* | 6/2011 | Tonno et al. ................... 701/100 |
| 2011/0224959 A1* | 9/2011 | Zhang et al. ....................... 703/2 |
| 2012/0070266 A1* | 3/2012 | Schaberg et al. ................. 415/1 |
| 2013/0054031 A1* | 2/2013 | Wilkes et al. .................. 700/274 |
| 2013/0066615 A1* | 3/2013 | Morgan et al. ..................... 703/7 |

* cited by examiner

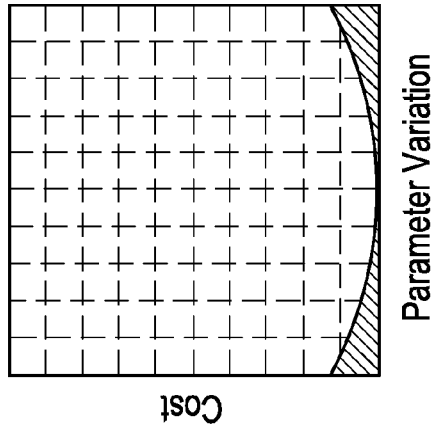
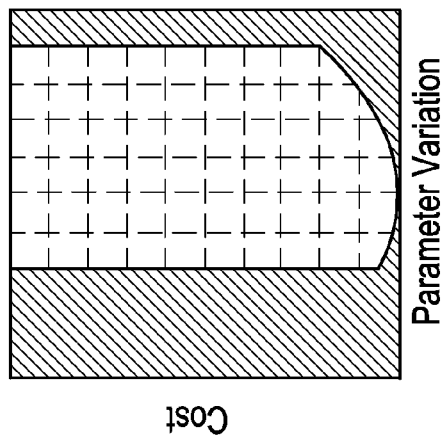
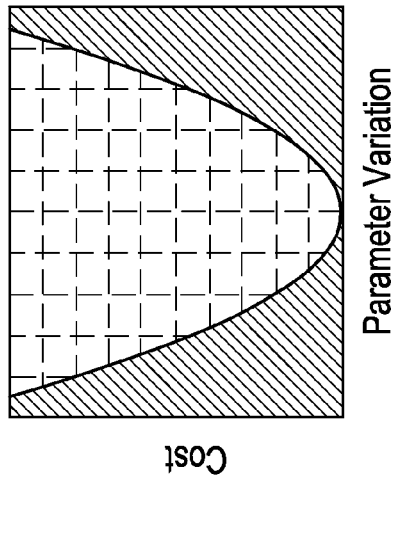
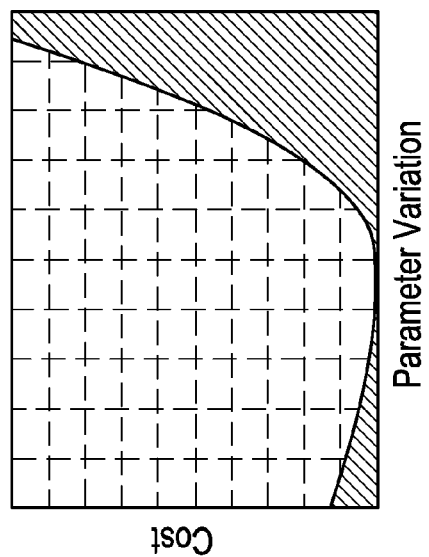

SYSTEM AND METHOD TO PERFORMANCE TUNE A SYSTEM

BACKGROUND OF THE INVENTION

The subject matter disclosed herein relates to a command controller in a control system to obtain target performance.

In a combined cycle power plant, which includes a gas turbine and a steam turbine driven by the heat generated by the gas turbine, for example, each subsystem (gas turbine, steam turbine, etc.) includes a controller to adjust parameters to achieve a given target performance for that subsystem. When the overall system performance is considered, such as to determine if the system is achieving quoted performance levels, for example, human intervention has been necessary to determine which subsystems should be adjusted and what target performance each of those subsystems should achieve. A command controller to determine the target for each subsystem in order to achieve an overall system target performance without human intervention would be appreciated in the art.

BRIEF DESCRIPTION OF THE INVENTION

According to one aspect of the invention, a control system includes one or more controllers, each of the one or more controllers being configured to control a respective one of one or more subsystems of a site system by changing values of a respective set of parameters; a site reference model configured to indicate a target performance of the site system; and a processor configured to instruct the one or more controllers based on the target performance for the site system.

According to another aspect of the invention, a method of performance tuning a site system includes determining a target performance for the site system; determining a gap between the target performance and a real performance of the site system; and instructing one or more controllers, each of the one or more controllers controlling a respective one of one or more subsystems of the site system, each instruction instructing a controller to obtain a target subsystem performance for a corresponding subsystem by changing one or more parameters of the subsystem.

According to yet another aspect of the invention, a system to performance tune a combined cycle power plant includes one or more controllers, each of the one or more controllers being configured to control a respective one of one or more subsystems of the combined cycle power plant by changing values of a respective set of parameters; a site reference model configured to indicate a target performance of the combined cycle power plant; and a processor configured to determine a performance gap for the combined cycle power plant based on the site reference model, to determine a target subsystem performance for each of the one or more subsystems based on a priority and a tolerance of each parameter in the respective set of parameters of the one or more subsystems, and to instruct the one or more controllers based on the target subsystem performance.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 2-5 illustrate exemplary costs associated with changing parameters according to an embodiment of the invention.

The detailed description explains embodiments of the invention, together with advantages and features, by way of example with reference to the drawings.

DETAILED DESCRIPTION OF THE INVENTION

Embodiments of the present invention are described with specific reference to a combined cycle power plant. However, it should be understood that the various embodiments are not limited to the exemplary system and are applicable to any system with one or more subsystems that can be controlled to attain a target performance.

Figure 1:
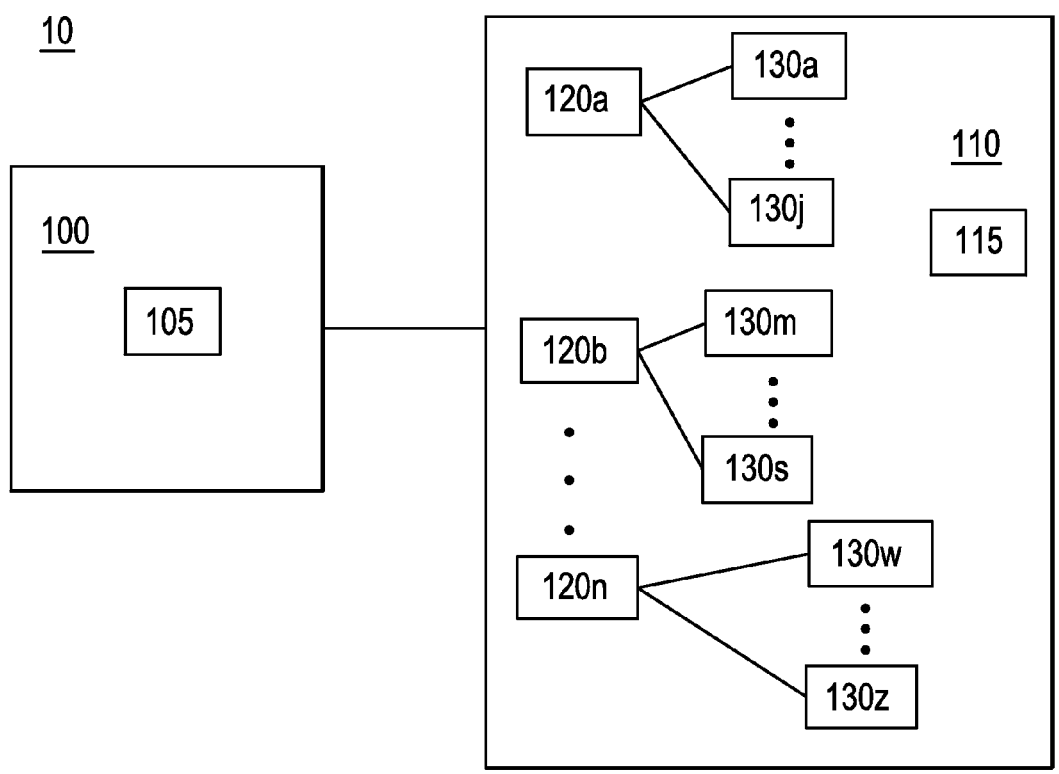
FIG. 1 is a block diagram of a control system according to an embodiment of the invention.

FIG. 1 is a block diagram of a control system 10 according to an embodiment of the invention. The control system 10 includes a command controller 100 to control a combined cycle system 110. The command controller 100 may be temporarily or permanently co-located with the combined cycle system 110 or may operate remotely. The command controller 100 includes or, in an alternate embodiment, is in communication with a site reference model 105, and the combined cycle system 110 includes a site specific model 115. The site reference model 105 approximates the operation of the real combined cycle system 110. The site reference model 105 may have been used, for example, to determine the quoted performance values for the combined cycle system 110 prior to its installation on-site. The site specific model 115 is maintained to reflect the real operation of the combined cycle system 110. Thus, the site reference model 105 can be regarded as indicating the ideal performance of the combined cycle system 110 according to its design, while the site specific model 115 can be regarded as indicating the actual performance of the combined cycle system 110. Ideally, the two models 105, 115 would indicate the same performance output for the combined cycle system 110. However, because of mechanical tolerances in the actual combined cycle system 110, the performance indicated by the site specific model 115 may differ from (be degraded from) the performance indicated by the site reference model 105. Because some deviations in the real combined cycle system 110 from the design of the site reference model 105 cannot be corrected without a substantial effort (e.g., rotor replacement), those types of differences must, instead, be mitigated through the control of various parameters 130 of the combined cycle system 110 in order to achieve the quoted performance output with the real combined cycle system 110.

The combined cycle system 110 includes various parameters 130 controlled by a plurality of controllers 120. Control within the combined cycle system 110 is comprised of a set of controllers 120 each controlling parameters 130 associated with a certain subsystem. For example, parameters 130a through 130j controlled by controller 120a may be parameters 130 associated with the steam turbine subsystem of the combined cycle system 110. As another example, parameters 130m through 130s controlled by controller 120b may be parameters 130 associated with the heat recovery steam generator (HRSG) subsystem. Some of the parameters 130 associated with the gas turbine subsystem, for example, include firing temperature of the gas turbine combustion system, inlet guide vane angle, variable stator vane angle, inlet bleed heat flow, and compressor extraction flow. In prior systems that did not benefit from the command controller 100 and site specific model 115, the site reference model 105 may have been available and may have provided the quoted performance values for the combined cycle system 110. In those prior systems, human intervention was needed to adequately control the parameters 130 of the combined cycle system 110 to achieve quoted performance values. The human intervention may have involved an analysis of the differences between the site reference model 105 and the real combined cycle system 110. A person would set targets for the controllers 120 based on the analysis in order to have the combined cycle system 110 performance approach or equal the quoted performance values (performance of the site reference model 105).

As noted above, the combined cycle system 110 is an exemplary system with a plurality of controllers 120 for a plurality of subsystems that benefits from the command controller 100. However, any system, for example a turbomachine with a single controller 120, also benefits from a command controller 100 according to an embodiment of the invention. In the case of a single controller 120 system, the command controller 100 may be executed on the same processor as the controller 120. The command controller 100 determines a gap between the performance indicated by the site reference model 105 and the site specific model 115 and sets a target performance for the single controller 120, in the case of the turbomachine or another single-controller 120 system, to close the gap without the need for human intervention.

The command controller 100 is able to analyze the site reference model 105 and the site specific model 115 to more readily ascertain the differences that lead to the real combined cycle system 110 not achieving the quoted performance values. Once the differences (gap in performance between real and quoted) are analyzed and understood by the command controller 100, the command controller 100 determines the necessary control needed from each of the controllers 120 to close the gap. In one embodiment, the command controller 100 performs a rule-based multi-dimensional optimization routine to determine a target for each controller 120 based on the priority (in what order should a given parameter 130 be changed) and tolerance (how much can a given parameter 130 be changed) associated with each parameter 130. That is, an algorithm solves for the lowest cost path to match site reference model 105 output to site specific model 115 output. Alternately, the command controller 100 could be a neural network that is trained to learn the costs over time.

FIGS. 2-5 illustrate exemplary costs associated with changing parameters 130 according to an embodiment of the invention. A range of parameter 130 values is shown on the x (horizontal) axis and the cost associated with a parameter 130 value in the range is shown on the y (vertical) axis. The command controller 100 analyzes the costs in conjunction with priorities of the parameters 130 to affect changes in the combined cycle system 110 with little or, ideally, no cost. As shown by FIGS. 2-5, each parameter 130 is represented by a parabola that indicates the cost associated with changing that parameter 130. For example, a given parameter 130 may have a high priority because controlling that parameter 130 affects the performance of the combined cycle system 110 substantially, but the tolerance (amount of change) for the parameter 130 may be low before a high cost is incurred. This situation is illustrated by FIG. 2. In another example, illustrated by FIG. 3, a parameter 130 may have a high tolerance such that the parameter 130 can be changed over a wide range without a significant change in cost. If such a parameter 130 also has a high priority (has a significant effect on overall combined cycle system 110 performance), then the parameter 130 is a good candidate for control by the command controller 100. FIG. 4 illustrates a situation in which a parameter 130 value may be decreased with little cost but leads to a high cost if its value is increased. FIG. 5 illustrates a situation in which a parameter 130 has limits within which it may be changed with low cost. Ultimately, the command controller 100 must balance the priority and tolerance of multiple parameters 130. Unlike the controllers 120 that operate on one or more parameters 130 to reach a target performance set for a given subsystem, the command controller 100 does not operate on any given parameter 130 itself but, instead, sets the targets for the individual controllers 120 based on the analysis of priority and tolerance (cost) of the various parameters 130 controlled by the various controllers 120.

The command controller 100 and each of the controllers 120 may be comprised of one or more memory devices and one or more processors. The site reference model 105 is shown as part of the command controller 100 by FIG. 2, but, in alternate embodiments, the site reference model 105 may be executed by a separate processor or set of processors along with one or more memory devices. The command controller 100 may be brought on-site to the combined cycle system 110 or remotely integrated with the combined cycle system 110 for periodic (e.g., seasonal) adjustments or may be permanently co-located with the combined cycle system 110 to continually adjust performance to compensate for degradation.

Figure 6:
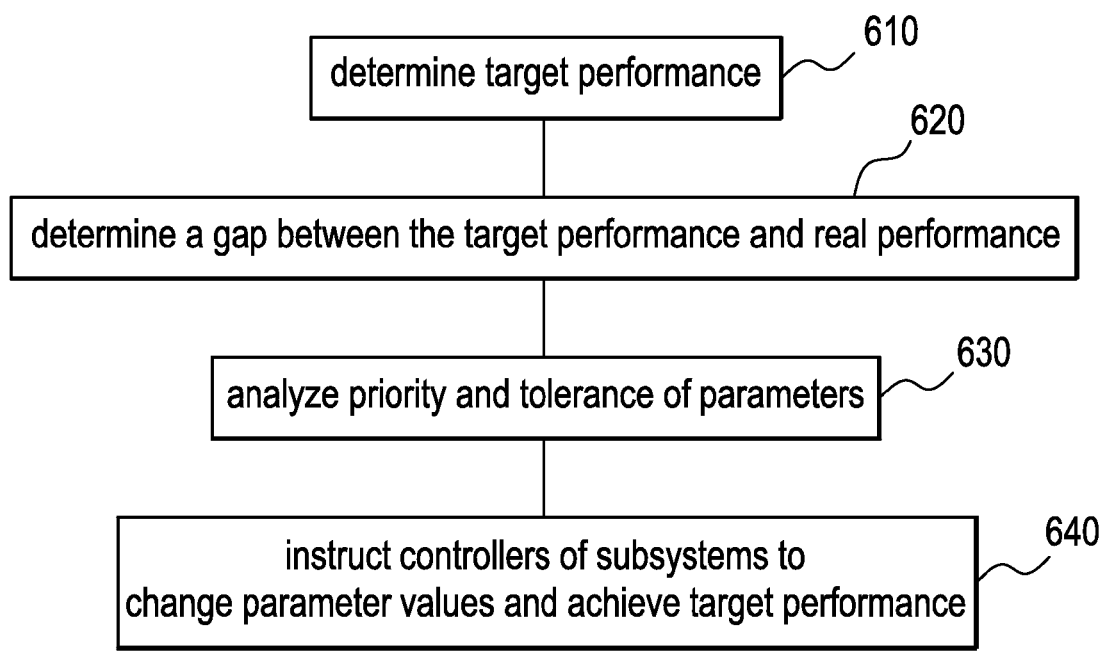
FIG. 6 depicts processes included in the controlling the controllers to performance tune the combined cycle system according to an embodiment of the invention.

FIG. 6 depicts processes included in the controlling the controllers 120 to performance tune the combined cycle system 110 according to an embodiment of the invention. At block 610, determining target performance for the combined cycle system 110 involves a site reference model 105. The target performance may be quoted performance for the combined cycle system 110 that was provided before initiation of operation of the combined cycle system 110. At block 620, determining a gap between the target performance and the real performance of the combined cycle system 110 may include using a site specific model 115 and analyzing differences between the site reference model 105 and the site specific model 115. At 630, analyzing priority and tolerance of parameters 130 of the subsystems controlled by the controllers 120 includes accessing stored information about each parameter 130. The information may be represented as shown by exemplary FIGS. 2-5. Once the command controller 100 analyzes the parameters 130 to determine the most efficient way to close the gap between real performance and target performance of the combined cycle system 110, instructing the controllers 120 of the respective subsystems (at block 640) includes the command controller 100 instructing the controllers 120 to change parameter 130 values in accordance with the priority and tolerance analysis to achieve a specified target performance for each subsystem.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system to performance tune a site system, comprising:
one or more controllers, each of the one or more controllers being configured to control a respective one of one or more subsystems of the site system by changing values of a respective set of parameters;
a site reference model configured to define a target performance of the site system, the target performance indicating an ideal performance of the site system according to a design of the site system and irrespective of any current parameter values of the site system;
a processor configured to instruct the one or more controllers based on the target performance for the site system defined by the site reference model;
a site specific model configured to indicate an actual output of the site system, wherein the processor determines a difference between the site reference model and the site specific model to determine a performance gap of the site system; and
a memory device configured to store a priority and a tolerance associated with each parameter of the set of parameters for each of the one or more subsystems of the site system, the priority of a parameter indicating an order in which to change the parameter and the tolerance of the parameter indicating an amount within which to change the parameter, wherein
the processor determines a target subsystem performance for each of the one or more subsystems and instructs the one or more controllers to control the respective one or more subsystems based on the performance gap and the target subsystem performance according to an analysis of the priority and the tolerance of parameters of the one or more subsystems.

2. The system according to claim 1, wherein the site system is a combined cycle power plant, and the one or more subsystems include one or more of a gas turbine, a heat recovery steam generator (HRSG), and a steam turbine.

3. The system according to claim 1, wherein the site system is a turbomachine.

4. The system according to claim 3, wherein the parameters include one or more of a firing temperature of a gas turbine combustion system, an inlet guide vane angle, a variable stator vane angle, an inlet bleed heat flow, and a compressor extraction flow.

5. A method of performance tuning a site system, the method comprising:
determining a target performance for the site system, the target performance being irrespective of any current parameter values of the site system;
determining a gap between the target performance and a real performance of the site system;
analyzing a priority and a tolerance of each parameter among two or more parameters of each of the one or more subsystems of the site system; and
instructing one or more controllers, each of the one or more controllers controlling a respective one of one or more subsystems of the site system, each instruction instructing a controller among the one or more controllers to obtain a target subsystem performance for a corresponding subsystem among the one or more subsystems by changing one or more parameters of the two or more parameters of the subsystem according to the priority and tolerance in order to close the gap between the target performance and the real performance of the site system, and
wherein the determining the gap includes analyzing a site reference model that defines the target performance of the site system and a site specific model that indicates actual performance of the site system.

6. The method according to claim 5, wherein the site system is a combined cycle power plant.

7. The method according to claim 6, wherein the instructing the one or more controllers includes instructing controllers of one or more of a gas turbine, a heat recovery steam generator (HRSG), and a steam turbine.

8. The method according to claim 5, wherein the site system is a turbomachine.

9. The method according to claim 8, wherein the analyzing the priority and the tolerance of parameters includes analyzing the priority and the tolerance of one or more of a firing temperature of a gas turbine combustion system, an inlet guide vane angle, a variable stator vane angle, an inlet bleed heat flow, and a compressor extraction flow.

10. A system to performance tune a combined cycle power plant, the system comprising:
one or more controllers, each of the one or more controllers being configured to control a respective one of one or more subsystems of the combined cycle power plant by changing values of a respective set of parameters;
a site reference model configured to define a target performance of the combined cycle power plant, the target performance being irrespective of any current parameter values of the combined cycle power plant;
a processor configured to determine a performance gap for the combined cycle power plant based on the site reference model, to determine a target subsystem performance for each of the one or more subsystems based on a priority and a tolerance of each parameter in the respective set of parameters of the one or more subsystems, and to instruct the one or more controllers based on the target subsystem performance; and
a memory device configured to store the priority and the tolerance associated with each parameter of the respective set of parameters of each of the one or more subsystems, wherein the processor accesses the memory device and determines the target subsystem performance for each of the one or more subsystems and instructs the one or more controllers to minimize a cost of approaching the target performance of the combined cycle power plant.

11. The system according to claim 10, further comprising a site specific model configured to indicate actual performance of the combined cycle power plant.

12. The system according to claim 11, wherein the processor is configured to determine the performance gap by determining a difference between the site reference model and the site specific model.

13. The system according to claim 10, wherein the cost is a function of the priority and the tolerance of each of the set of parameters.

14. The system according to claim 10, wherein the one or more subsystems include a gas turbine, a heat recovery steam generator (HRSG), and a steam turbine.

* * * * *